United States Patent Office 3,598,841
Patented Aug. 10, 1971

3,598,841
PROCESS FOR CONVERTING TANGERETIN TO NOBILETIN
Lyle J. Swift, Winter Haven, Fla., assignor to the United States of America as represented by the Secretary of Agriculture
No Drawing. Filed Mar. 27, 1969, Ser. No. 811,253
Int. Cl. C07d 7/34
U.S. Cl. 260—345.5            1 Claim

ABSTRACT OF THE DISCLOSURE

A process is provided for converting tangeretin to nobiletin, the latter being effective against a fungus that affects citrus seedlings.

---

A non-exclusive, irrevocable, royalty-free license in the invention herein described, throughout the world for all purposes of the United States Government, with the power to grant sublicenses for such purposes, is hereby granted to the Government of the United States of America.

Nobiletin is effective against the fungus *Deuterophoma tracheiphila* which fungus is pathogenic relative to citrus seedlings. Rough lemon seedlings inoculated with the said fungus rapidly develop the symptoms of "mal secco," whereas infusion of the fungus inoculated seedlings with nobiletin solution prevents appearance of the disease symptoms.

Nobiletin (5,6,7,8,3',4'-hexamethoxyflavone) has been found in the fruit of a number of citrus varieties, particularly in the peel. Juice squeezed from orange peel contains about 0.1 gram per liter but it is associated with a number of other closely related compounds and it is difficult to recover in pure form from this source.

Nobiletin has been synthesized previously in small quantities from simpler molecules by bench-scale laboratory methods but this is complicated and yields are small.

The newly developed method utilizes tangeretin which is much more abundant and easily recovered from tangerine peel oil as a source of part of the nobiletin molecule. This portion is condensed with commercially available veratric aldehyde. Nobiletin was prepared in the laboratory for use in a large scale evaluation of this compound's possible relation to off-flavors in orange juice. Interest in it has increased since it has been shown to be of influence in certain biological reactions in plants and animals.

It is effective against mal secco disease of citrus trees in the Mediterranean area (A Ben Aziz C A. 66, 73340 (1947)).

This invention makes use of tangeretin as a starting material for the preparation of nobiletin. Tangeretin is obtainable in considerable quantity as a precipitate thrown down when tangerine peel oil is chilled the precipitated sludge is washed to remove residual peel oil, the crude tangeretin then being recrystallized from ethanol or methanol. Alkaline degradation of the tangeretin gives 2-OH,3,4,5,6-tetramethoxyacetophenone as one of the products. This is separated by a simple procedure and condensed with veratraldehyde to give a chalcone which is then cyclized to nobiletin.

The tangeretin used was obtained from the sludge from tangerine peel oil. Remaining peel oil was removed by filtration and extraction with hydrocarbon solvent. Phenolic substances were removed by extraction with dilute alkali. Purification was by recrystallization from methanol.

The first step in the process was the alkaline degradation of tangeretin. To accomplish this 215 grams of tangeretin, purified as above, was heated with 286 grams potassium hydroxide in 1.4 liters of ethanol until solution was complete and the mixture had become dark red in color. One liter of water was then added and the mixture was refluxed for two hours on the steam bath after which about 1200 ml. of solvent was slowly distilled out of the mixture over a period of 5.5 hours. The original volume was restored with water. Other bases, concentrations, and conditions will accomplish the degradation, but in general, relatively low base concentrations favor the particular fragmentation of the tangeretin molecule that is desired.

In the degradation accomplished above, four products were produced. These were anisic acid, 4-methoxyacetophenone, tetramethoxysalicylic acid, and 2-OH,3,4,5,6-tetramethoxyacetophenone. The last-named compound is the one needed for the synthesis of nobiletin. The alkaline aqueous mixture of the degradation step was extracted with benzene to remove the neutral 4-methoxyacetophenone. The other products stayed in solution as the related salts. The benzene extracted alkaline solution was then saturated with gaseous carbon dioxide to precipitate the phenolic 2-OH-3,4,5,6-tetramethoxyacetophenone. This precipitate was in turn removed by extraction with benzene and the unwanted acids remained in the aqueous solution as their respective salts. The benzene extract of the phenolic 2-OH,3,4,5,6-tetramethoxyacetophenone was then washed with water and the benzene solvent removed under vacuum. The yellow liquid residue of 2-OH,3,4,5,6-tetramethoxyacetophenone weighed 85.3 grams, a yield of 56% of the theoretical amount of this compound obtainable from 215 grams tangeretin. In the separation step of the procedure certain variations are permissible that will not materially affect the result. For example, the extractions can be made with other organic solvents immiscible with water such as ether, chloroform, carbon tetrachloride, etc. Also, the neutralization of the excess alkali can be partly carried out with mineral acids as long as it is completed with gaseous carbon dioxide. This insures a final pH at which phenols will precipitate, but carboxylic acids will not.

The next step in the process was the base-catalyzed condensation of the 2-OH,3,4,5,6-tetramethoxyacetophenone with 3,4-dimethoxybenzaldehyde (veratric aldehyde) to give the corresponding chalcone. To accomplish this step the entire 85.3 grams of the substituted acetophenone obtained above and 57 grams 3,4-dimethoxybenzaldehyde were dissolved in 166 ml. ethanol. The solution mixture was then added slowly with shaking to 800 ml. saturated sodium hydroxide solution. A copious red precipitate formed immediately. The mxiture soon became viscous and was allowed to stand overnight. The red precipitate of the chalcone was then filtered out on a Buchner funnel fitted with a glass-wool pad. The dewatered precipitate was dissolved in about 10 l. water and the resultant aqueous solution saturated with carbon dioxide gas to precipitate the phenolic chalcone. The orange precipitate was separated out of the mixture and subsequently recrystallized from ethanol. Three crops of the chalcone were obtained melting at 101–3°, 78–81°, and 74–78° C. The total weight of the chalcone obtained was 87 grams. Several variations of the procedure are permissible. Methanol, for example, can be substituted for ethanol and potassium hydroxide for sodium hydroxide. An excess of 3,4-dimethoxybenzaldehyde can be used to advantage rather than the stoichiometric amount listed in the procedure above, articularly since a Cannizzaro-type disproportionation can convert part of the aldehyde to the corresponding acid and alcohol in which case the aldehyde is lost to the reaction. It is also permissible to partially neutralize the excess alkali with mineral acid, but in this event, the neutralization must be completed with carbon dioxide gas in order to precipitate only the phenolic chalcone and not precipitate any of the veratric acid that may result from disproportionation of the reactant aldehyde. If any excess of the aldehyde is employed, this is particularly important.

The final step in the procedure was the cyclization of the chalcone to the desired nobiletin. The entire 87 grams of the crude chalcone from above was refluxed with 104 grams selenium dioxide in 1.3 l. n-amyl alcohol for 12 hours after which the mixture was filtered while still hot. The amyl alcohol was then distilled from the filtrate under vacuum and the residue was recrystallized from methanol in three crops totaling 54.6 grams in weight. The nobiletin thus obtained was well-crystallized, yellow in color, and had an acceptable melting point of 136–138° C. for the known compound. Recrystallization from methanol and finally from benzene gave a final product melting at 138–139° C. and weighing 48.5 grams. This represented an overall yield of 20.8%. NMR spectra supported the claimed structures of the tangeretin starting material, the intermediate chalcone, and the final nobiletin.

The "mal secco" disease of citrus varieties, caused by the pathogenic fungus Deuterophoma tracheiphila, is widespread through the Mediterranean (Israel, Egypt, Cyprus, Turkey, Greece, Italy, Southern France) and Black Sea areas. The economic importance of the disease derives from the fact that it greatly reduces the life expectancy of affected lemon groves; other citrus varieties such as grapefruit also appear to be susceptible. No means of prevention or cure have yet been suggested.

Many bioflavonoid compounds have been isolated from citrus plants, but their physiologic roles in the mechanism of resistance to disease are obscure. Certain unidentified substances have been shown to inhibit growth of D. tracheiphila in virto.

The sources of the isolated substance were dried leaves, bark, or peel of resistant varieties of tangerine (Citrus reticulata Bl.) such as Dancy and Cleopatra tangerines and clementines. Water extracts of these materials inhibited growth of the fungus in vitro.

This example is a test with nobiletin in vivo. Sixteen 1-year-old, healthy, rough lemon seedlings, which are highly susceptible to mal secco, were inoculated with D. tracheiphila in the following manner. The fungus was grown on a liquid medium until the mycelium developed a dense mass of pycnidia containing fertile spores. This mass was disintegrated, and portions were introduced into cuts made in the main stems of the seedlings before the cuts were tightly covered with cellotape.

Starting immediately after the inoculation, 8 of the 16 seedlings were treated with a nobiletin extract containing 100 p.p.m. of nobiletin and 5 percent ethanol. This solution was administered continuously over a 3-month period as follows: a syringe needle was connected to a 100-ml. plastic reservoir containing nobiletin solution. The point of the needle was introduced into the xylem of the main stem in an area about 10 cm. below the inoculation site, resulting in continuous infusion of the nobiletin solution. Control seedlings were treated similarly but with the fungistat omitted. The results of one such experiment appear in Table I.

After 4 weeks of treatment most of the control seedlings showed the first signs of mal secco. Within 6 weeks, six of the untreated controls died, and two died 1 week later. On the other hand, none of the nobiletin-treated seedlings died within 3 months, although two began to show signs of disease.

TABLE I

Effect of treatment with nobiletin on rough lemon seedlings inoculated with D. tracheiphila. Of 16 seedlings inoculated, half were treated with nobiletin (see text), while the remainder served as controls.

| | Seedlings affected (Number) | |
|---|---|---|
| | Controls | Treated |
| After inoculation (wk.): | | |
| 4 | [1] 6 | 0 |
| 6 | 1 2 | 0 |
| | [2] 6 | 0 |
| 8 | ([3]) | 0 |
| 12 | | [1] 2 |

[1] Chlorotic appearance of upper leaves.
[2] Dieback of main stem, followed by death a few days later.
[3] All dead.

Having thus described my invention, I claim:
1. A process for converting tangeretin to nobiletin, which process comprises the following steps carried out in sequence:
   (a) heating tangeretin in ethanolic solution with an excess of potassium hydroxide until the alkaline degradation is complete as evidenced by complete solution of the reactants and by development of a dark red color in the reaction mixture,
   (b) replacing the ethanol solvent with water by the joint expedients of adding water to the reaction mixture and removing ethanol by distillation to produce an aqueous reaction mixture containing the salts of anisic acid and tetramethoxysalicylic acid, 4 - methoxyacetophenone, and 2 - OH,3,4,5,6-tetramethoxyacetophenone,
   (c) removing the 4-methoxyacetophenone and the 2-OH,3,4,5,6 - tetramethoxyacetophenone from the aqueous reaction mixture by extraction with benzene,
   (d) saturating the benzene extract from step (c) with gaseous $CO_2$ to precipitate the 2-OH,3,4,5,6-tetramethoxyacetophenone,
   (e) separating mechanically the precipitated 2-OH,3,4,5,6 - tetramethoxyacetophenone from step (d),
   (f) condensing at room temperature and in a saturated sodium hydroxide solution, 2 - OH,3,4,5,6 - tetramethoxyacetophenone and 3,4 - dimethoxybenzaldehyde both in ethanolic solution to produce the corresponding chalcone as a precipitate,
   (g) separating mechanically the precipitated chalcone,
   (h) cyclizing, at reflux temperature and in n-amyl alcohol solution, the chalcone from step (g) with selenium dioxide to produce nobiletin,
   (i) separating mechanically the nobiletin in n-amyl alcohol solution from the selenium dioxide, and
   (j) removing by distillation the n-amyl alcohol solvent to recover the product nobiletin.

References Cited

UNITED STATES PATENTS 3,450,717   6/1969   Kramer et al. _____ 260—345.5X

JOHN M. FORD, Primary Examiner

U.S. Cl. X.R.

260—590, 592; 424—283